United States Patent
Lu et al.

(10) Patent No.: US 12,513,745 B2
(45) Date of Patent: Dec. 30, 2025

(54) MEDIUM ACCESS RECOVERY MECHANISM FOR NON-SIMULTANEOUS-TRANSMISSION-AND-RECEPTION PEER MULTI-LINK DEVICES

(71) Applicant: MediaTek Singapore Pte. Ltd., Singapore (SG)

(72) Inventors: Kai Ying Lu, San Jose, CA (US); James Chih-Shi Yee, San Jose, CA (US); Yongho Seok, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 658 days.

(21) Appl. No.: 17/942,570

(22) Filed: Sep. 12, 2022

(65) Prior Publication Data

US 2023/0103988 A1    Apr. 6, 2023

Related U.S. Application Data

(60) Provisional application No. 63/276,806, filed on Nov. 8, 2021, provisional application No. 63/251,710, filed on Oct. 4, 2021.

(51) Int. Cl.
*H04W 74/08* (2024.01)
*H04W 56/00* (2009.01)
*H04W 74/0816* (2024.01)

(52) U.S. Cl.
CPC ... *H04W 74/0816* (2013.01); *H04W 56/0055* (2013.01)

(58) Field of Classification Search
CPC ......... H04W 74/0816; H04W 74/0808; H04W 74/0825; H04W 56/0055; H04W 56/004;
(Continued)

(56) References Cited

U.S. PATENT DOCUMENTS

2021/0144698 A1    5/2021  Kwon et al.
2021/0211375 A1*   7/2021  Kwon ................. H04W 72/535
(Continued)

FOREIGN PATENT DOCUMENTS

CN        113015234 A      6/2021
WO    WO 2021194125 A1    9/2021

OTHER PUBLICATIONS 802 11 Working Group of the LAN/MAN Standards Committee of the IEEE Computer Society: Draft Standard for Information technology-IEEE Draft; Draft P802.11BE_D1.2_REDLINE_COMPARED_TO_D1.0, IEEE-SA, Pisca, pp. 1-809, XP068192047 (Year: 2021).*

(Continued)

*Primary Examiner* — Phong La

(74) *Attorney, Agent, or Firm* — Andy M. Han; Han IP PLLC

(57) ABSTRACT

A station (STA) affiliated with a non-simultaneous-transmission-and-reception (NSTR) multi-link device (MLD) obtains a transmission opportunity (TXOP) on a first link of an NSTR link pair as a TXOP initiator while a medium synchronization delay timer of the STA is non-zero. STA determines that an intended TXOP responder has lost medium synchronization. The STA then transmits a control frame as an initial frame in the TXOP to the intended TXOP responder on the first link responsive to the determining.

13 Claims, 8 Drawing Sheets

(58) Field of Classification Search
CPC ........... H04W 56/0015; H04W 56/001; H04W 56/002; H04W 56/0025; H04W 56/0005
See application file for complete search history.

(56) References Cited

U.S. PATENT DOCUMENTS

| | | | |
|---|---|---|---|
| 2021/0266891 A1 | 8/2021 | Chu et al. | |
| 2021/0315025 A1* | 10/2021 | Seok | H04W 74/0808 |
| 2021/0385692 A1* | 12/2021 | Kwon | H04W 28/24 |
| 2022/0053441 A1* | 2/2022 | Seok | H04L 1/188 |
| 2022/0167406 A1* | 5/2022 | Xin | H04W 74/002 |
| 2022/0279601 A1* | 9/2022 | Xue | H04W 74/0816 |
| 2022/0345973 A1* | 10/2022 | Sun | H04W 74/0816 |
| 2022/0394756 A1* | 12/2022 | Jang | H04W 84/12 |
| 2023/0043667 A1* | 2/2023 | Ghosh | H04W 74/0808 |
| 2023/0354451 A1* | 11/2023 | Jang | H04W 74/0816 |

OTHER PUBLICATIONS

Dibakar Das (Intel): "PDT-MAC-MLO-NSTR-blindness—TBD", IEEE Draft; 11-21-0221-06-00BE-PDT-MAC-MLO-NSTR-BLINDNESS-TBD, IEEE-SA Mentor, Piscataway, NJ USA, vol. 802.11 EHT; 802.1be, No. 6, Mar. 17, 2021 (Mar. 17, 2021), pp. 1-5, XP068179270 (Year: 2021).*
Asterjadhi Alfred et al.: "TGbe Spec Text Volunteers and Status", IEEE, May 19, 2021 (May 19, 2021), pp. 1-75, XP093017981 (Year: 2021).*
Taiwan Intellectual Property Office, Office Action for Taiwan Patent Application No. 111137679, Jan. 7, 2023.
European Patent Office, Extended European Search Report for European Patent Application No. 22199655.6, Feb. 8, 2023.
Dibakar Das (Intel): "PDT-MAC-MLO-NSTR-blindness—TBD", IEEE Draft; 11-21-0221-06-00BE-PDT-MAC-MLO-NSTR-Blindness-TBD, IEEE-SA Mentor, Piscataway, NJ USA, vol. 802.11 EHT; 802.1be, No. 6, Mar. 17, 2021 (Mar. 17, 2021), pp. 1-5, XP068179270.
Asterjadhi Alfred et al.: "TGbe Spec Text Volunteers and Status", IEEE, May 19, 2021 (May 19, 2021), pp. 1-75, XP093017981.

* cited by examiner

MEDIUM ACCESS RECOVERY MECHANISM FOR NON-SIMULTANEOUS-TRANSMISSION-AND-RECEPTION PEER MULTI-LINK DEVICES

CROSS REFERENCE TO RELATED PATENT APPLICATION(S)

The present disclosure is part of a non-provisional patent application claiming the priority benefit of U.S. Provisional Patent Application Nos. 63/251,710 and 63/276,806, filed 4 Oct. 2021 and 8 Nov. 2021, respectively, the contents of which herein being incorporated by reference in their entirety.

TECHNICAL FIELD

The present disclosure is generally related to wireless communications and, more particularly, to a medium access recovery mechanism for peer multi-link devices (MLDs) operating on a non-simultaneous-transmission-and-reception (NSTR) link pair in wireless communications.

BACKGROUND

Unless otherwise indicated herein, approaches described in this section are not prior art to the claims listed below and are not admitted as prior art by inclusion in this section.

In wireless communications under the Institute of Electrical and Electronics Engineers (IEEE) 802.11 standards, an MLD operating on an NSTR link pair is a multi-link device that does not support simultaneous transmission on one link of the NSTR link pair and reception on another link of the NSTR link pair due to in-device coexistence (IDC) (also called NSTR based) interference. Thus, when an NSTR MLD transmits on a first link (link 1) of an NSTR link pair, it may not be able to listen to transmissions on a second link (link 2) of the NSTR link pair and update its network allocation vector (NAV). During the NSTR MLD's transmission on link 1, it may not detect ongoing transmission(s) on link 2 due to interference from transmit power leakage from link 1 such that the NAV might not be updated on link 2 during a blindness period. In an event that the NSTR MLD transmits on link 2 without updated NAV information, virtual channel sensing would not be feasible and this may lead to collision on link 2. This scenario is expected to occur when an NSTR MLD is transmitting a physical-layer protocol data unit (PPDU) with a PPDU length greater than a threshold, and a medium synchronization delay (MediumSyncDelay) timer would be initiated for link 2 at the end of the PPDU transmission on link 1.

When a transmission opportunity (TXOP) initiator is a station (STA) affiliated with an MLD (e.g., non-access point (non-AP) MLD) operating on an NSTR link pair, and a TXOP responder is also a STA affiliated with another MLD (e.g., access point (AP) MLD) operating on the same NSTR link pair, each of the TXOP initiator and the TXOP responder might lose medium synchronization when another STA affiliated with the same non-AP MLD as the TXOP initiator and another STA affiliated with the same AP MLD as the TXOP responder were participating in a frame exchange on the other link of the NSTR link pair. When a STA receives a PPDU with a valid MAC protocol data unit (MPDU) length information or TXOP duration information, the MediumSyncDelay timer is reset to 0. When the MediumSyncDelay timer counts down or is reset to 0, a STA is recovered from medium synchronization. A TXOP initiator and a TXOP responder may know whether each other has lost medium synchronization, but they may not know whether the other has recovered from medium synchronization. Thus, one issue that needs to be addressed pertains to how the TXOP initiator with a non-zero MediumSyncDelay timer is to access the medium. Another issue that needs to be addressed pertains to how the TXOP responder with a non-zero MediumSyncDelay timer is to respond to the TXOP initiator.

Moreover, when an NSTR AP MLD operates on an NSTR link pair, one link of the NSTR link pair is designated as a primary link (P-link) while the other link of the NSTR link pair is designated as a non-primary link or secondary link (S-link). When the NSTR AP MLD or an associated NSTR non-AP MLD intends to transmit, it may initiate a PPDU transmission on the non-primary link only if it is also initiating a PPDU transmission as a TXOP holder on the primary link with the same start time. However, it may only transmit on the primary link. In NSTR AP MLD downlink (DL) transmission cases, when an AP affiliated with the NSTR AP MLD performs DL transmission on the primary link alone, the AP affiliated with the same NSTR AP MLD on the non-primary link (or secondary link) may suffer the issue of loss of medium synchronization and thus may start a MediumSyncDelay timer at the end of its DL PPDU transmission on the primary link. Since the NSTR AP MLD may initiate a PPDU transmission on the non-primary link only if it is also initiating a PPDU transmission on the primary link, there is an issue of how to initiate a TXOP on the primary link and the non-primary link when the NSTR AP MLD is blind on the non-primary link.

Therefore, there is a need for a solution of a medium access recovery mechanism for peer MLDs operating on a NSTR link pair to address aforementioned issues.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to a medium access recovery mechanism for peer MLDs operating on a NSTR link pair in wireless communications. Under various proposed schemes in accordance with the present disclosure, it is believed that aforementioned issues may be addressed or otherwise alleviated.

In one aspect, a method may involve a STA affiliated with an NSTR MLD obtaining a TXOP on a first link of an NSTR link pair as a TXOP initiator while a first MediumSyncDelay timer of the STA is non-zero. The method may also involve the STA determining that an intended TXOP responder has lost medium synchronization. The method may further involve the STA transmitting a control frame as an initial frame in the TXOP to the intended TXOP responder on the first link responsive to the determining.

In another aspect, a method may involve a STA affiliated with an NSTR MLD receiving a control frame as an initial frame in a TXOP on a first link of an NSTR link pair from a TXOP initiator, with the control frame received when a first MediumSyncDelay timer of the STA is non-zero. The method may also involve the STA transmitting, as an intended TXOP responder, a control response frame or a trigger-based response frame to the TXOP initiator responsive to receiving the control frame.

In yet another aspect, an apparatus implementable in an NSTR MLD may include a transceiver and a processor coupled to the transceiver. The transceiver may be configured to communicate wirelessly. The processor may be configured to perform operations as a first STA on a primary link and a second STA on a secondary link of an NSTR link pair, respectively. The processor may determine that the second STA has lost medium synchronization on the secondary link. The processor may also transmit, via the transceiver and as the first STA, a PPDU on the primary link. The processor may further start, as the second STA, a MediumSyncDelay timer at an end of transmission of the PPUD. The processor may additionally transmit, via the transceiver and as the first STA and the second STA, a first initial frame on the primary link and a second initial frame on the secondary link to initiate new TXOPs on the NSTR link pair.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, WiMax, Bluetooth, ZigBee, $5^{th}$ Generation (5G)/New Radio (NR), Long-Term Evolution (LTE), LTE-Advanced, LTE-Advanced Pro, Internet-of-Things (IoT), Industrial IoT (IoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to a medium access recovery mechanism for peer MLDs operating on a NSTR link pair in wireless communications. According to the present disclosure, a number of possible solutions may be implemented separately or jointly. That is, although these possible solutions may be described below separately, two or more of these possible solutions may be implemented in one combination or another.

Figure 1:
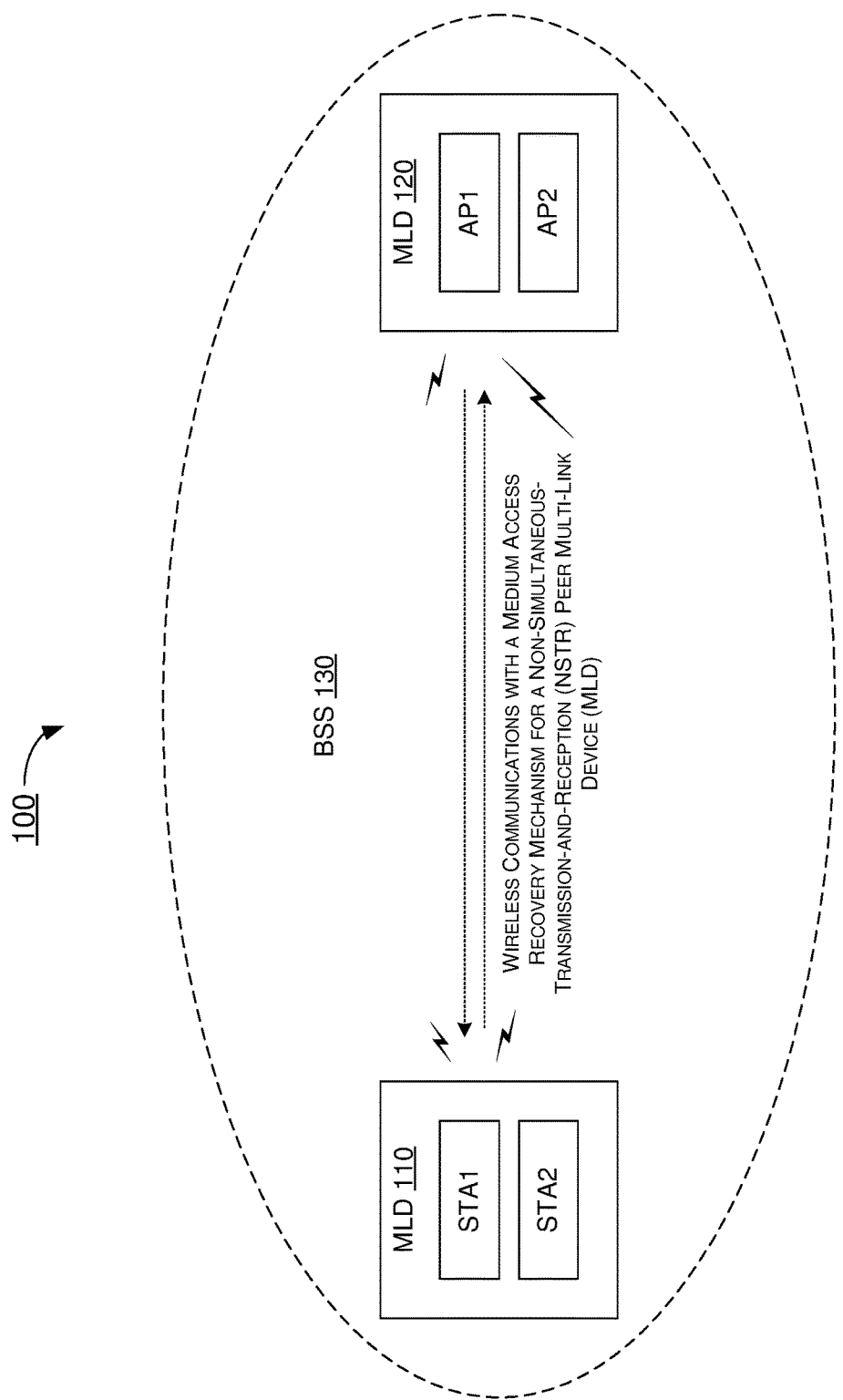
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 8 illustrate examples of implementation of various proposed schemes in network environment 100 in accordance with the present disclosure. The following description of various proposed schemes is provided with reference to FIG. 1~FIG. 8.

Referring to FIG. 1, network environment 100 may involve at least an MLD 110 and an MLD 120 communicating wirelessly with each other in a basic service set (BSS) 130 in accordance with one or more IEEE 802.11 standards (e.g., IEEE 802.11be and beyond). Each STA of multiple STAs (denoted as "STA1" and "STA2" in FIG. 1) affiliated with MLD 110 may function as a non-AP STA, and each STA of multiple STAs (denoted as "AP1" and "AP2" in FIG. 1) affiliated with MLD 120 may function as an AP STA. That is, MLD 110 may be an NSTR non-AP MLD and MLD 120 may be an NSTR AP MLD operating on an NSTR link pair. Moreover, each of MLD 110 and MLD 120 may be configured to utilize a medium access recovery mechanism for peer MLDs operating on a NSTR link pair in wireless communications in accordance with various proposed schemes, as described below. It is noteworthy that, while the various proposed schemes may be individually or separately described below, in actual implementations each of the proposed schemes may be utilized individually or separately. Alternatively, some or all of the proposed schemes may be utilized jointly.

Figure 2:
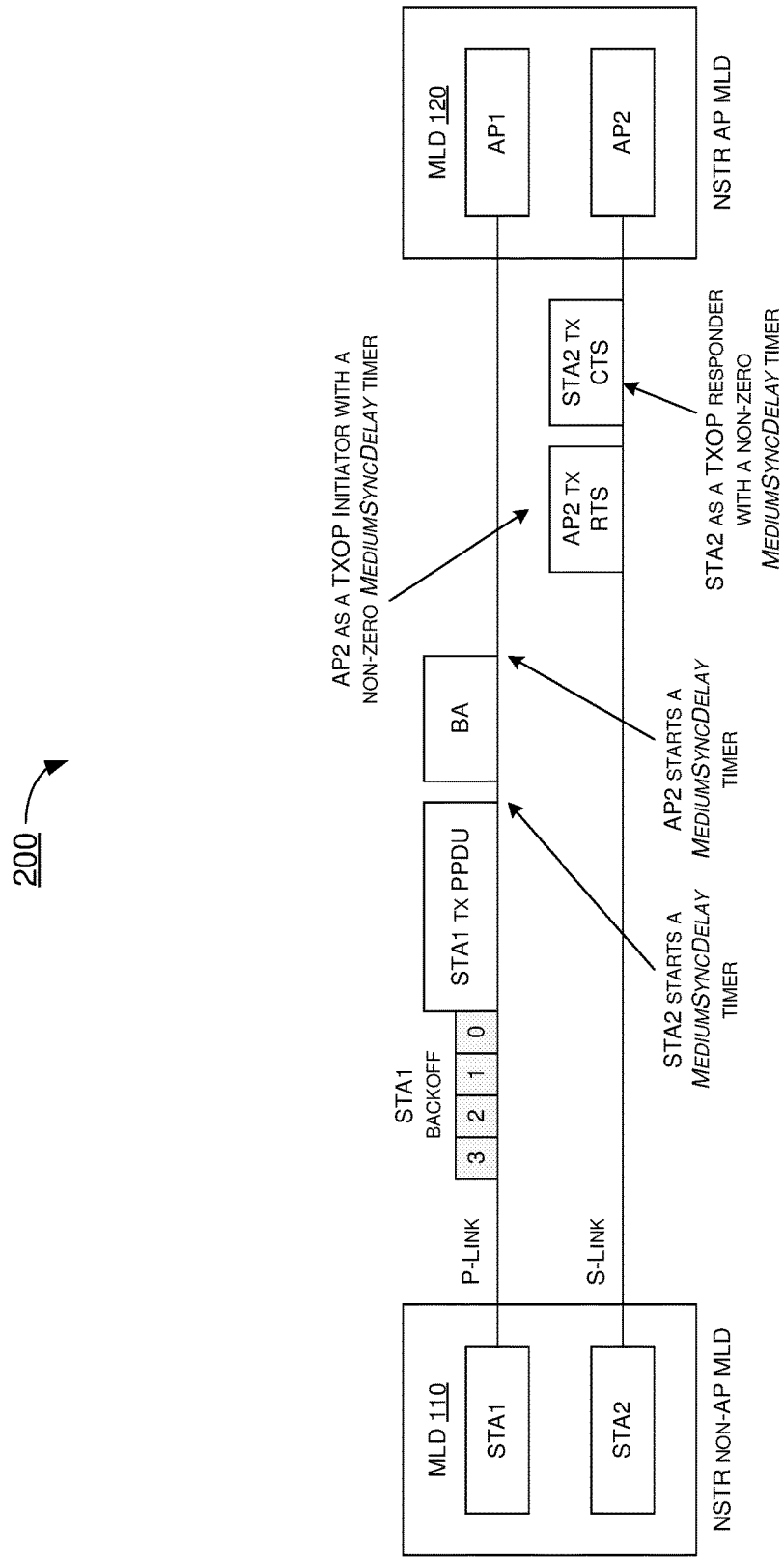
FIG. 2 is a diagram of an example scenario in accordance with the present disclosure.

For illustrative purposes only and without limiting the scope of the present disclosure, FIG. 2 illustrates an example scenario in accordance with the present disclosure. Specifically, scenario 200 may involve MLD 110 (as an NSTR non-AP MLD) and MLD 120 (as an NSTR AP MLD) operating as a TXOP initiator and a TXOP responder, respectively, and each starts a MediumSyncDelay timer on an S-link of an NSTR link pair due to loss of medium synchronization. Referring to FIG. 2, STA1 and STA2 may be affiliated with an NSTR non-AP MLD (e.g., MLD 110) on a P-link and the S-link of the NSTR link pair, respectively. Additionally, AP1 and AP2 may be affiliated with an NSTR AP MLD on the P-link and S-link, respectively. In scenario 200, when STA1 was transmitting a PPDU to AP1 on the P-link, STA2 lost its medium synchronization and thus STA2 started a MediumSyncDelay timer at the end of transmission of the PPDU by STA1. Similarly, when AP1 was transmitting an acknowledgement frame of a block acknowledgement (BA), AP2 lost its medium synchronization (in case that the length of the BA is greater than a medium synchronization threshold, MediumSyncThreshold) and thus AP2 started a MediumSyncDelay timer at the end of transmission of the BA by AP1.

Various proposed schemes described below aim to address the issue of how the TXOP initiator with a non-zero MediumSyncDelay timer is to access the medium, as well as to address the issue of how the TXOP responder with a non-zero MediumSyncDelay timer is to respond to the TXOP initiator.

Under a first proposed scheme in accordance with the present disclosure with respect to medium access recovery for a peer NSTR MLD, a TXOP initiator, which is capable of obtaining a TXOP while the MediumSyncDelay timer has a non-zero value (e.g., due to loss of medium synchronization), may transmit a control frame with an indication of loss of medium synchronization (herein interchangeably referred to as a "medium sync lost indication") as an initial frame of an obtained TXOP, in an event that an intended TXOP responder might have lost medium synchronization. For instance, the TXOP initiator may use a MediumSyncDelay idle channel assessment energy detection threshold to perform a backoff procedure for channel access. Additionally, the TXOP initiator may reset its MediumSyncDelay timer to zero after receiving a response frame from the TXOP responder. The control frame may be a request-to-send (RTS), multi-user RTS (MU-RTS) or trigger frame. The medium sync lost indication may be provided in at least one of the following ways: (i) swapping a transmitter address (TA) and a recipient address (RA) of the control frame; (ii) setting the 'Individual/Group address' bit to 1 of either the TA field, the RA field, or both the TA and RA fields of the control frame; (iii) setting one or more bits in the frame control subfield of the RTS frame to indicate loss of medium synchronization (e.g., by setting the 'TD DS', 'From DS', 'More Frag' or 'Retry' bit to 1); and (iv) setting a bit/subfield in the Common Info field or User Info field of the MU-RTS to a special value (e.g., the UL Length subfield in the Common Info field or the AID12 subfield in the User Info field).

Under the first proposed scheme, the TXOP initiator may determine that the intended TXOP responder might have lost its medium synchronization in one or more ways. For instance, the determination may be based on the intended TXOP responder being affiliated with an NSTR MLD operating on an NSTR link pair. Alternatively, or additionally, the determination may be based on the other STA affiliated with the same NSTR MLD as the intended TXOP responder on the other link of the NSTR link pair having participated a TXOP. Alternatively, or additionally, the determination may be based on the intended TXOP responder meeting certain conditions (e.g., the transmission time is greater than MediumSyncThreshold) to start the MediumSyncDelay timer. Alternatively, or additionally, the determination may be based on the MediumSyncDelay timer of the intended TXOP responder having not counted down to zero.

Under the first proposed scheme, the intended TXOP responder may respond with a control response frame or a trigger-based (TB) response frame to a received control frame carrying a medium sync lost indication. For instance, in an event that the MediumSyncDelay timer of the intended TXOP responder has a zero value, the intended TXOP responder may determine that the channel is idle by using a regular CCA and NAV mechanism to respond to the received control frame. In an event that the MediumSyncDelay timer of the intended TXOP responder has a non-zero value, the intended TXOP responder may determine that the channel is idle by using a modified CCA-ED threshold and NAV mechanism to respond to the received control frame. Moreover, the intended TXOP responder may reset its MediumSyncDelay timer to zero after transmitting the control response frame or TB response frame or after the end of the TXOP.

Alternatively, in an event that the MediumSyncDelaytimer of the intended TXOP responder has a non-zero value, the intended TXOP responder may not respond with a control response frame or a TB response frame in response to receiving the control frame carrying the medium sync lost indication. In such cases, the intended TXOP responder may not reset its MediumSyncDelay timer to zero after receiving the control frame from the TXOP initiator.

Under a second proposed scheme in accordance with the present disclosure with respect to medium access recovery for a peer NSTR MLD, a TXOP initiator, which is capable of obtaining a TXOP while the MediumSyncDelay timer has a non-zero value (e.g., due to loss of medium synchronization), may not transmit any frame until the MediumSyncDelay timer is reset to zero or expires. Additionally, the TXOP initiator may use a regular CCA-ED threshold to perform a backoff procedure for channel access. Moreover, the control frame may be a RTS, MU-RTS or trigger frame. Under the second proposed scheme, the TXOP initiator may determine that the intended TXOP responder might have lost its medium synchronization in one or more ways. For instance, the determination may be based on the intended TXOP responder being affiliated with an NSTR MLD operating on an NSTR link pair. Alternatively, or additionally, the determination may be based on the other STA affiliated with the same NSTR MLD as the intended TXOP responder on the other link of the NSTR link pair having participated a TXOP. Alternatively, or additionally, the determination may be based on the intended TXOP responder meeting certain conditions (e.g., the transmission time is greater than MediumSyncThreshold) to start the MediumSyncDelay timer. Alternatively, or additionally, the determination may be based on the MediumSyncDelay timer of the intended TXOP responder having not counted down to zero.

Under the second proposed scheme, the intended TXOP responder may respond with a control response frame or a TB response frame in response to receiving the control frame. In an event that the MediumSyncDelay timer of the intended TXOP responder has a non-zero value, the intended TXOP responder may determine that the channel is idle by using a regular CCA-ED threshold or a modified CCA-ED threshold and NAV mechanism to respond to the received control frame. The intended TXOP responder may also reset its MediumSyncDelay timer after transmitting the control response frame or after the end of the TXOP.

Under a third proposed scheme in accordance with the present disclosure with respect to medium access recovery for a peer NSTR MLD, a TXOP initiator, which is capable of obtaining a TXOP while the MediumSyncDelay timer has a non-zero value (e.g., due to loss of medium synchronization), may transmit a control frame as an initial frame of an obtained TXOP, in an event that the intended TXOP responder might have lost its medium synchronization. Additionally, the TXOP initiator may use a modified CCA-ED threshold to perform a backoff procedure for channel access. The TXOP initiator may also reset its MediumSyncDelay timer to zero after receiving a response frame from the TXOP responder or after the end of the TXOP. The control frame may be a RTS, MU-RTS or trigger frame.

Under the third proposed scheme, the TXOP initiator may determine that the intended TXOP responder might have lost its medium synchronization in one or more ways. For instance, the determination may be based on the intended TXOP responder being affiliated with an NSTR MLD operating on an NSTR link pair. Alternatively, or additionally, the determination may be based on the other STA affiliated with the same NSTR MLD as the intended TXOP responder on the other link of the NSTR link pair having participated a TXOP. Alternatively, or additionally, the determination may be based on the intended TXOP responder meeting certain conditions (e.g., the transmission time is greater than MediumSyncThreshold) to start the MediumSyncDelay timer. Alternatively, or additionally, the determination may be based on the MediumSyncDelay timer of the intended TXOP responder having not counted down to zero.

Under the third proposed scheme, the intended TXOP responder may respond with a control response frame or a TB response frame in response to receiving the control frame. In an event that the intended TXOP responder determines that the TXOP initiator might have lost its medium synchronization and that the intended TXOP responder has a non-zero value for its MediumSyncDelay timer, the intended TXOP responder may perform certain operations. For instance, the intended TXOP responder may use a modified CCA-ED threshold and NAV mechanism to respond to the received control frame. Alternatively, or additionally, the intended TXOP responder may reset its MediumSyncDelay timer after transmitting the response frame or after the end of the TXOP. Otherwise, responsive to determining that the TXOP initiator has not lost its medium synchronization, the intended TXOP responder may use a regular CCA-ED and NAV mechanism to respond to the received control frame.

Under the third proposed scheme, the intended TXOP responder may determine that the TXOP initiator might have lost its medium synchronization in one or more ways. For instance, the determination may be based on the TXOP initiator being affiliated with an NSTR MLD operating on an NSTR link pair. Alternatively, or additionally, the determination may be based on the other STA affiliated with the same NSTR MLD as the TXOP initiator on the other link of the NSTR link pair having participated a TXOP. Alternatively, or additionally, the determination may be based on the TXOP initiator meeting certain conditions (e.g., the transmission time is greater than MediumSyncThreshold) to start the MediumSyncDelay timer. Alternatively, or additionally, the determination may be based on the MediumSyncDelay-timer of the TXOP initiator having not counted down to zero.

Various proposed schemes described below aim to address the issue of how to initiate a TXOP on the primary link and the non-primary link when the NSTR AP MLD is blind on the non-primary link.

Under a fourth proposed scheme in accordance with the present disclosure with respect to medium synchronization parameters setting, an AP affiliated with an NSTR AP MLD may include a Medium Synchronization Delay Information field in a Basic variant Multi-Link element carried in an Association Response frame, Beacon frame or Probe Response frame. Moreover, the AP affiliated with an NSTR AP MLD and a STA affiliated with an NSTR non-AP MLD may initialize Medium Synchronization Delay Information to default values. For instance, the initializing may involve setting a Medium Synchronization OFDM ED Threshold to −72 dBm (as a modified CCA-ED threshold), setting a Medium Synchronization Maximum Number of TXOPs to 1, and setting a value of the MediumSyncDelay timer to a PPDU maximum time (aPPDUMaxTime) defined in extremely-high-throughput (EHT) physical layer (PHY) characteristics in one or more IEEE 802.11 standards (e.g., IEEE 802.11be and beyond). Furthermore, a non-AP STA affiliated with a non-AP MLD may set its MediumSyncDelay timer, Medium Synchronization Maximum Number of TXOPs, and Medium Synchronization OFDM ED Threshold to most recent values contained in the Medium Synchronization Delay Information field, respectively, in an event that they are present in a Basic variant Multi-Link element received from an associated AP. Similarly, an AP affiliated with an NSTR AP MLD may set its MediumSyncDelay timer, Medium Synchronization Maximum Number of TXOPs, and Medium Synchronization OFDM ED Threshold to most recent values contained in the Medium Synchronization Delay Information field, respectively, in an event that they are present in a Basic variant Multi-Link element received from an associated AP.

Under a fifth proposed scheme in accordance with the present disclosure with respect to channel access recovery, when an AP affiliated with an NSTR AP MLD on a non-primary link of an NSTR link pair loses its medium synchronization, and in case the APs affiliated with the NSTR AP MLD intend to initiate TXOPs on the NSTR link pair, both may transmit a control frame (e.g., RTS) as an initial frame to obtain a TXOP respectively. The AP with a non-zero MediumSyncDelay timer that is affiliated with the NSTR AP MLD on the non-primary link may use the Medium Synchronization OFDM ED Threshold to detect a channel condition. The AP that is affiliated with the NSTR AP MLD on the primary link of the NSTR link pair may use a regular orthogonal frequency-division multiplexing (OFDM) ED Threshold to detect a channel condition. In an event that the AP on the non-primary link fails to receive a CTS response frame in response to the RTS frame, the AP may not retry to send RTS in case the AP on the primary link obtains a TXOP. In an event that the AP on the non-primary link fails to receive the CTS response frame in response to the RTS frame, after the MediumSyncDelay timer counts down to zero, the AP on the non-primary link may initiate a backoff procedure and start a PPDU transmission together with the PPDU transmission on the primary link in case the channel condition is idle.

Under the fifth proposed scheme, when a non-AP STA affiliated with an NSTR non-AP MLD on the non-primary link loses its medium synchronization, and in case the STAs affiliated with the NSTR non-AP MLD intend to initiate TXOPs on the NSTR link pair, both may transmit a control frame (e.g., RTS) as an initial frame to obtain a TXOP respectively. The STA with a non-zero MediumSyncDelay timer that is affiliated with the NSTR non-AP MLD on the non-primary link may use the Medium Synchronization OFDM ED Threshold to detect a channel condition. The STA that is affiliated with the NSTR non-AP MLD on the primary link of the NSTR link pair may use a regular OFDM ED Threshold to detect a channel condition. In an event that the STA on the non-primary link fails to receive a CTS response frame in response to the RTS frame, the STA may not retry to send RTS in case the STA on the primary link obtains a TXOP. In an event that the STA on the non-primary link fails to receive the CTS response frame in response to the RTS frame, after the MediumSyncDelay timer counts down to zero, the STA on the non-primary link may initiate a backoff procedure and start a PPDU transmission together with the PPDU transmission on the primary link in case the channel condition is idle.

Figure 3:
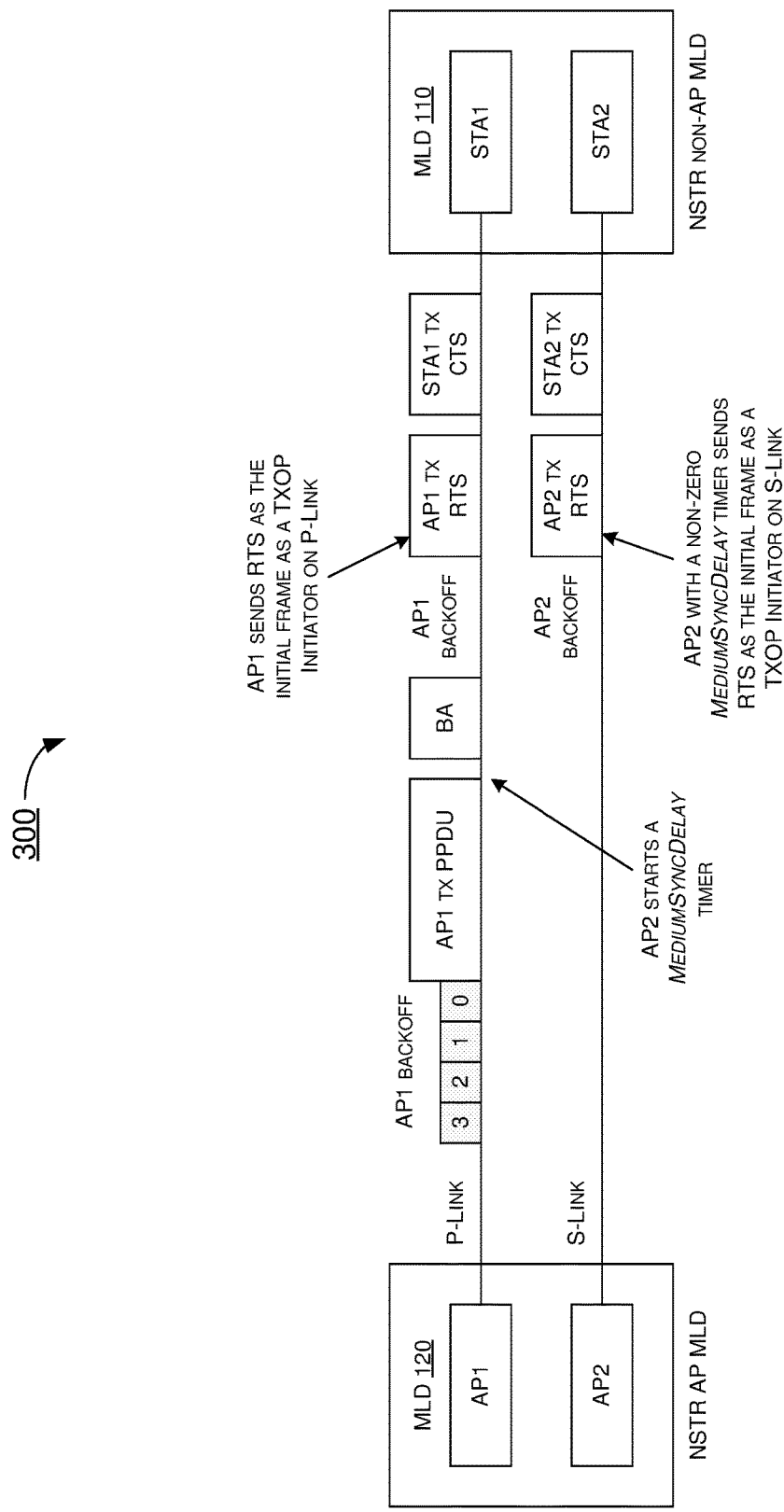
FIG. 3 is a diagram of an example scenario in accordance with the present disclosure.

FIG. 3 illustrates an example scenario 300 in accordance with the present disclosure. Specifically, scenario 300 may involve MLD 110 (as an NSTR non-AP MLD) and MLD 120 (as an NSTR AP MLD) operating as a TXOP initiator and a TXOP responder, respectively. Scenario 300 pertains to a situation in which a TXOP initiator AP1 transmits on P-link and AP2 loses its medium synchronization on S-link, with AP1 and AP2 being affiliated with the same NSTR AP MLD on the P-link and S-link, respectively. Referring to FIG. 3, as AP2 lost medium synchronization, AP2 started a MediumSyncDelay timer at the end of transmission of a PPDU by AP1. When AP1 and AP2 intend to initiate new TXOPs on the NSTR link pair, both AP1 and AP2 may transmit a control frame RTS as an initial frame to obtain a TXOP, in an event that AP2 has a non-zero MediumSyncDelay timer. AP1 and AP2 may follow a channel contention access rule by performing a backoff procedure respectively before transmitting the RTS frames. The RTS frames may be transmitted by AP1 and AP2 at the same time. When AP2 with a non-zero MediumSyncDelay timer performs its backoff procedure, AP2 may use the Medium Synchronization OFDM ED Threshold to detect the channel condition. On the other hand, AP1 may perform its backoff procedure using a regular OFDM ED threshold.

Figure 4:
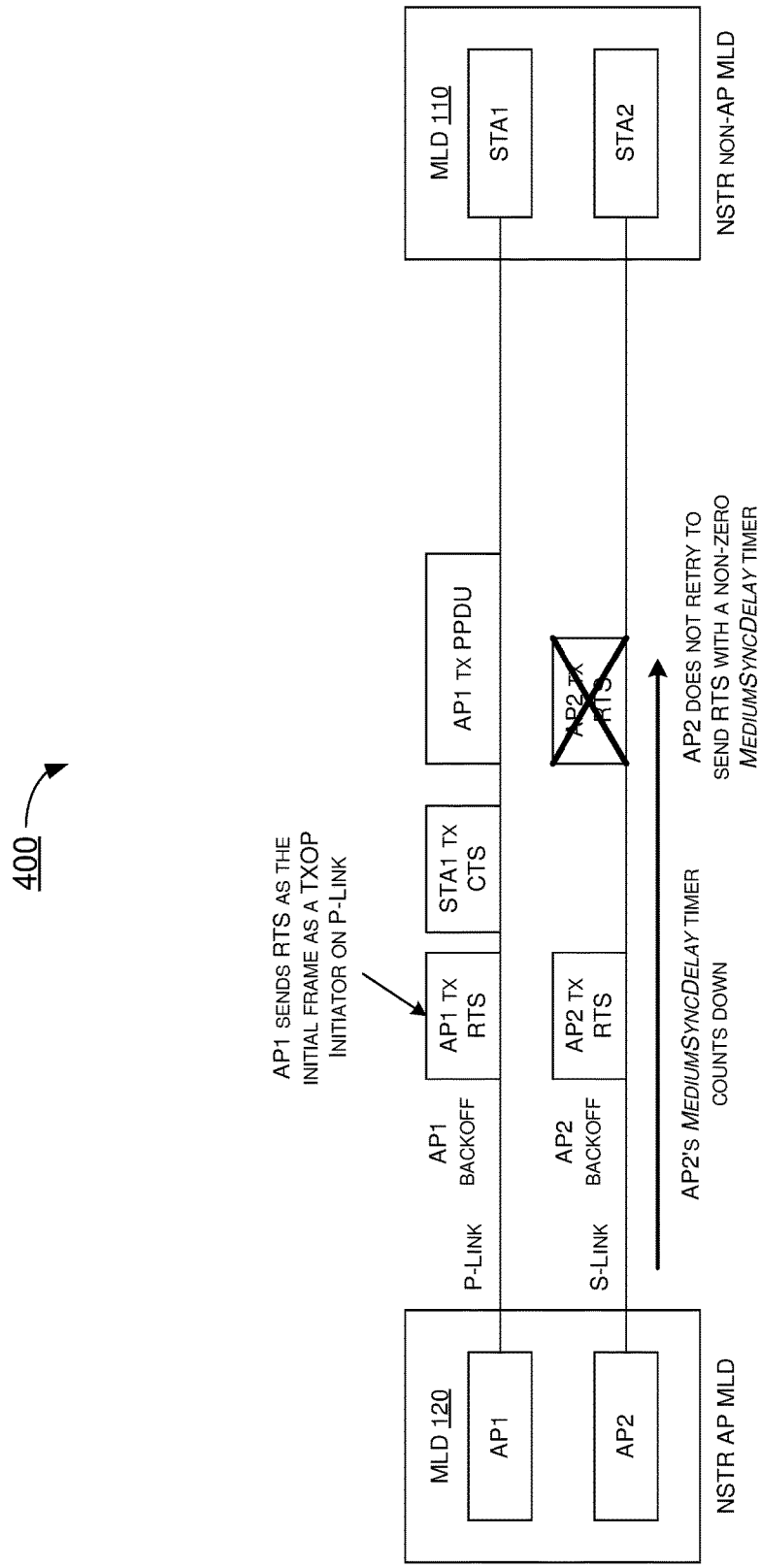
FIG. 4 is a diagram of an example scenario in accordance with the present disclosure.

FIG. 4 illustrates an example scenario 400 in accordance with the present disclosure. Specifically, scenario 400 may involve MLD 110 (as an NSTR non-AP MLD) and MLD 120 (as an NSTR AP MLD) operating as a TXOP initiator and a TXOP responder, respectively. Scenario 400 pertains to a situation in which AP2 lost its medium synchronization on S-link with a non-zero MediumSyncDelay timer counting down, with AP1 and AP2 being affiliated with the same NSTR AP MLD on the P-link and S-link, respectively. Referring to FIG. 4, when AP1 and AP2 intend to initiate new TXOPs on the NSTR link pair, both AP1 and AP2 may transmit a control frame RTS as an initial frame to obtain a TXOP, in an event that AP2 has a non-zero MediumSyncDelay timer. AP1 and AP2 may follow a channel contention access rule by performing a backoff procedure respectively before transmitting the RTS frames. The RTS frames may be transmitted by AP1 and AP2 at the same time. AP2 may use the Medium Synchronization OFDM ED Threshold to perform its backoff procedure when its MediumSyncDelay timer is non-zero. On the other hand, AP1 may perform its backoff procedure using a regular OFDM ED threshold. As AP1 successfully obtains a TXOP on the P-link, AP2 fails to obtain a TXOP due to not receiving a CTS response frame and AP2 may not retry to send RTS frames.

Figure 5:
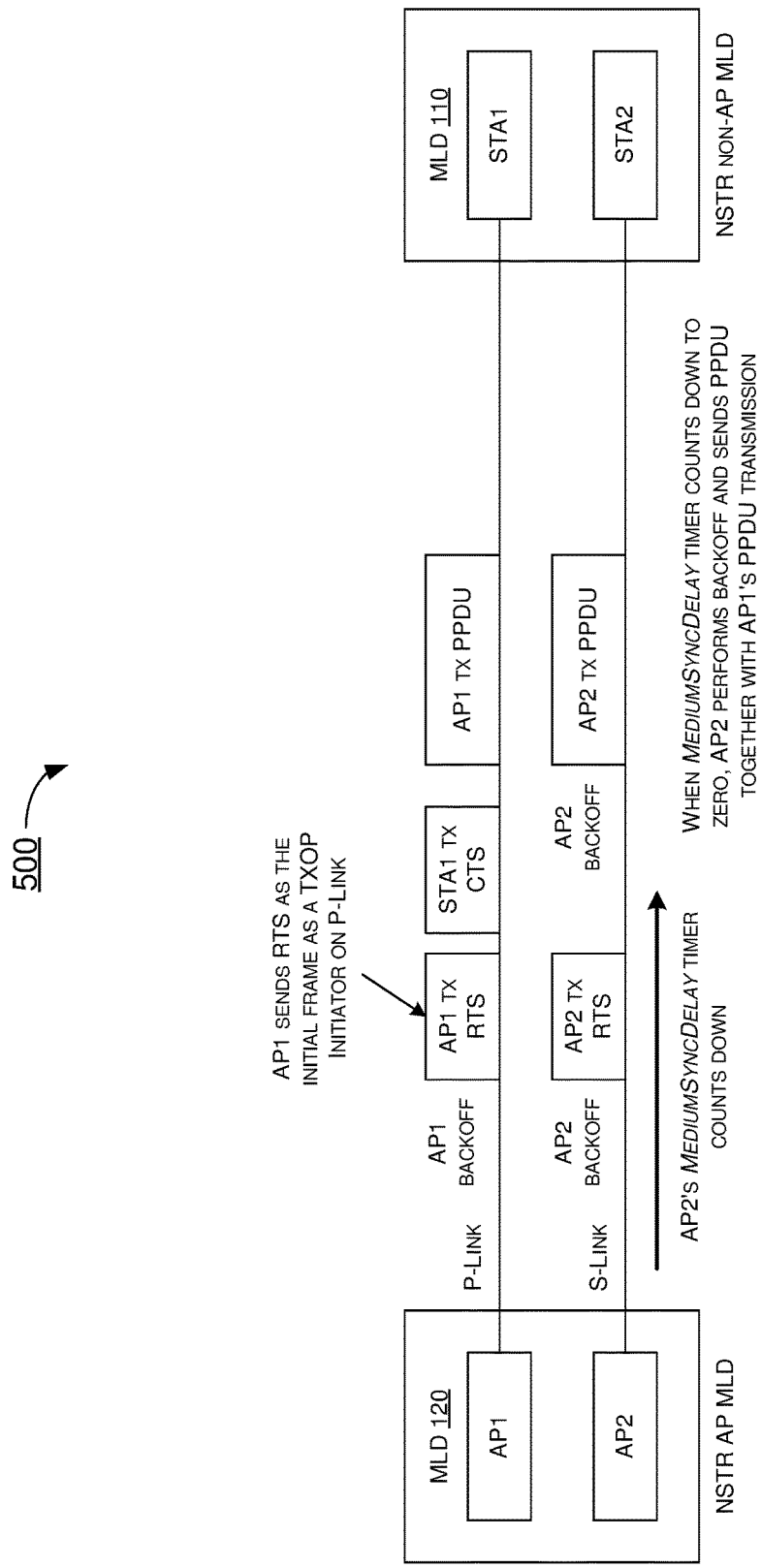
FIG. 5 is a diagram of an example scenario in accordance with the present disclosure.

FIG. 5 illustrates an example scenario 500 in accordance with the present disclosure. Specifically, scenario 500 may involve MLD 110 (as an NSTR non-AP MLD) and MLD 120 (as an NSTR AP MLD) operating as a TXOP initiator and a TXOP responder, respectively. Scenario 500 pertains to a situation in which AP2 lost its medium synchronization on S-link with a non-zero MediumSyncDelay timer counting down, with AP1 and AP2 being affiliated with the same NSTR AP MLD on the P-link and S-link, respectively. Referring to FIG. 5, when AP1 and AP2 intend to initiate new TXOPs on the NSTR link pair, both AP1 and AP2 may transmit a control frame RTS as an initial frame to obtain a TXOP, in an event that AP2 has a non-zero MediumSyncDelay timer. AP1 and AP2 may follow a channel contention access rule by performing a backoff procedure respectively before transmitting the RTS frames. The RTS frames may be transmitted by AP1 and AP2 at the same time. AP2 may use the Medium Synchronization OFDM ED Threshold to perform its backoff procedure when its MediumSyncDelay timer is non-zero. On the other hand, AP1 may perform its backoff procedure using a regular OFDM ED threshold. As AP1 successfully obtains a TXOP on the P-link, AP2 fails to obtain a TXOP due to not receiving a CTS response frame. After its MediumSyncDelay timer counts down to zero, AP2 may perform the backoff procedure and initiate a PPDU on the S-link together with transmission of a PPDU by AP1, in case the channel condition is idle.

Illustrative Implementations

Figure 6:
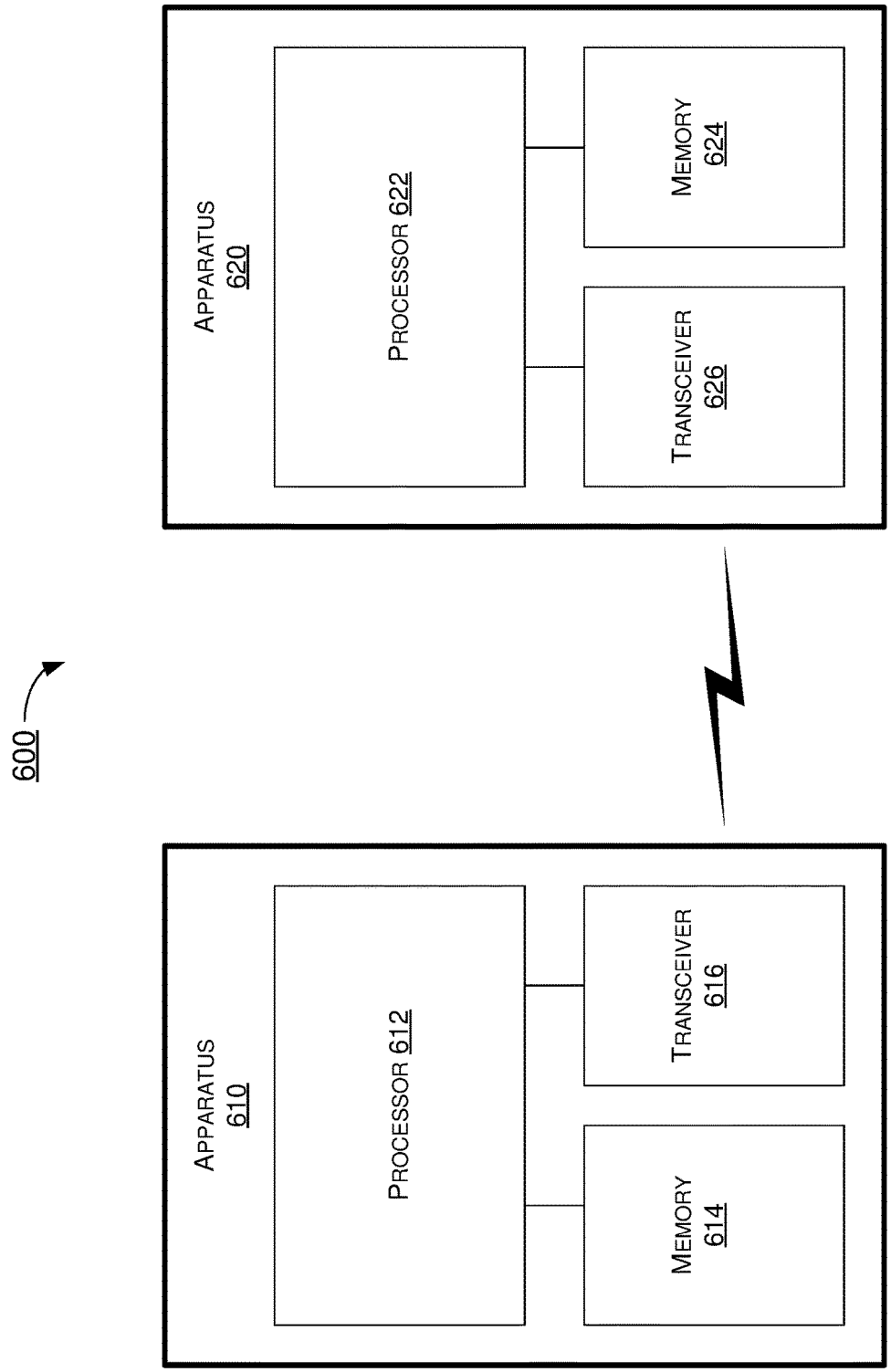
FIG. 6 is a block diagram of an example communication system in accordance with an implementation of the present disclosure.

FIG. 6 illustrates an example system 600 having at least an example apparatus 610 and an example apparatus 620 in accordance with an implementation of the present disclosure. Each of apparatus 610 and apparatus 620 may perform various functions to implement schemes, techniques, processes and methods described herein pertaining to a medium access recovery mechanism for peer MLDs operating on a NSTR link pair in wireless communications, including the various schemes described above with respect to various proposed designs, concepts, schemes, systems and methods described above as well as processes described below. For instance, apparatus 610 may be implemented in STA 110 and apparatus 620 may be implemented in STA 120, or vice versa.

Each of apparatus 610 and apparatus 620 may be a part of an electronic apparatus, which may be a non-AP MLD or an AP MLD, such as a portable or mobile apparatus, a wearable apparatus, a wireless communication apparatus or a computing apparatus. When implemented in a non-AP MLD, each of apparatus 610 and apparatus 620 may be implemented in a smartphone, a smart watch, a personal digital assistant, a digital camera, or a computing equipment such as a tablet computer, a laptop computer or a notebook computer. Each of apparatus 610 and apparatus 620 may also be a part of a machine type apparatus, which may be an IoT apparatus such as an immobile or a stationary apparatus, a home apparatus, a wire communication apparatus or a computing apparatus. For instance, each of apparatus 610 and apparatus 620 may be implemented in a smart thermostat, a smart fridge, a smart door lock, a wireless speaker or a home control center. When implemented in or as a network apparatus, apparatus 610 and/or apparatus 620 may be implemented in a network node, such as an AP MLD in a WLAN.

In some implementations, each of apparatus 610 and apparatus 620 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 610 and apparatus 620 may be implemented in or as a non-AP MLD or an AP MLD. Each of apparatus 610 and apparatus 620 may include at least some of those components shown in FIG. 6 such as a processor 612 and a processor 622, respectively, for example. Each of apparatus 610 and apparatus 620 may further include one or more other components not pertinent to the proposed scheme of the present disclosure (e.g., internal power supply, display device and/or user interface device), and, thus, such component(s) of apparatus 610 and apparatus 620 are neither shown in FIG. 6 nor described below in the interest of simplicity and brevity.

In one aspect, processor 612 and processor 622 may be implemented in the form of one or more single-core processors, one or more multi-core processors, one or more RISC processors or one or more CISC processors. That is, even though a singular term "a processor" is used herein to refer to processor 612 and processor 622, processor 612 and processor 622 may include multiple processors in some implementations and a single processor in other implementations in accordance with the present disclosure. In another aspect, processor 612 and processor 622 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, processor 612 and processor 622 is a special-purpose machine specifically designed, arranged and configured to perform specific tasks including those pertaining to a medium access recovery mechanism for peer MLDs operating on a NSTR link pair in wireless communications in accordance with various implementations of the present disclosure.

In some implementations, apparatus 610 may also include a transceiver 616 coupled to processor 612. Transceiver 616 may include a transmitter capable of wirelessly transmitting and a receiver capable of wirelessly receiving data. In some implementations, apparatus 620 may also include a transceiver 626 coupled to processor 622. Transceiver 626 may include a transmitter capable of wirelessly transmitting and a receiver capable of wirelessly receiving data.

In some implementations, apparatus 610 may further include a memory 614 coupled to processor 612 and capable of being accessed by processor 612 and storing data therein. In some implementations, apparatus 620 may further include a memory 624 coupled to processor 622 and capable of being accessed by processor 622 and storing data therein. Each of memory 614 and memory 624 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 614 and memory 624 may include a type of read-only memory (ROM) such as mask ROM, programmable ROM (PROM), erasable programmable ROM (EPROM) and/or electrically erasable programmable ROM (EEPROM). Alternatively, or additionally, each of memory 614 and memory 624 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 610 and apparatus 620 may be a communication entity capable of communicating with each other using various proposed schemes in accordance with the present disclosure. For illustrative purposes and without limitation, a description of capabilities of apparatus 610, as MLD 110 (e.g., a non-AP MLD operating on a NSTR link pair), and apparatus 620, as MLD 120 (e.g., an AP MLD), is provided below. It is noteworthy that, although the example implementations described below are provided in the context of WLAN, the same may be implemented in other types of networks. It is also noteworthy that, although examples described below are provide in the context of apparatus 610, the examples may also be applicable to apparatus 620 or otherwise implemented by apparatus 620.

In one aspect pertaining to a medium access recovery mechanism for peer MLDs operating on a NSTR link pair in wireless communications in accordance with the present disclosure, with apparatus 610 implementing a STA affiliated with an NSTR non-AP MLD (e.g., MLD 110) and apparatus 620 implementing an AP affiliated with an NSTR AP MLD (e.g., MLD 120), processor 612 may, as a STA, obtain, via transceiver 616, a TXOP on a first link of an NSTR link pair as a TXOP initiator while a first MediumSyncDelay timer of the STA is non-zero. Moreover, processor 612 may determine that apparatus 620 an intended TXOP responder has lost medium synchronization. Furthermore, processor 612 may transmit, via transceiver 616, a control frame as an initial frame in the TXOP to the intended TXOP responder on the first link responsive to the determining. It is noteworthy that the roles of apparatus 610 and apparatus 620 may be reversed and, in such a case, processor 622 of apparatus 620 may perform operations described above and below with respect to processor 612.

In some implementations, the control frame may include a RTS frame, a MU-RTS frame, or a trigger frame.

In some implementations, in determining that the intended TXOP responder has lost medium synchronization, processor 612 may determine based on at least one of the following: (i) the intended TXOP responder being affiliated with a second NSTR MLD operating on the NSTR link pair; (ii) another STA affiliated with the second NSTR MLD as another intended TXOP responder on a second link of the NSTR link pair having participated in another TXOP; (iii) the intended TXOP responder meeting a condition to start a second MediumSyncDelay timer of the intended TXOP responder; and (iv) the second MediumSyncDelay timer of the intended TXOP responder having not counted down to zero.

In some implementations, the condition may entail a transmission time being greater than a medium synchronization threshold.

In some implementations, processor 612 may also perform, via transceiver 616, a backoff procedure using a modified CCA-ED threshold to detect a channel condition.

In some implementations, processor 612 may also reset the first MediumSyncDelay timer to zero after receiving a response frame from the intended TXOP responder or after an end of the TXOP.

In some implementations, processor 612 may also determine a backoff procedure using a modified CCA-ED threshold to detect a channel condition.

In another aspect pertaining to a medium access recovery mechanism for peer MLDs operating on a NSTR link pair in wireless communications in accordance with the present disclosure, with apparatus 610 implementing a STA affiliated with an NSTR non-AP MLD (e.g., MLD 110) and apparatus 620 implementing an AP affiliated with an NSTR AP MLD (e.g., MLD 120), processor 612 may, as a STA, receive, via transceiver 616, a control frame as an initial frame in a TXOP on a first link of an NSTR link pair from apparatus 620 as a TXOP initiator, with the control frame received when a first MediumSyncDelay timer of the STA is non-zero. Moreover, processor 612 may, as an intended TXOP responder, transmit, via transceiver 616, a control response frame or a trigger-based response frame to the TXOP initiator responsive to receiving the control frame. It is noteworthy that the roles of apparatus 610 and apparatus 620 may be reversed and, in such a case, processor 622 of apparatus 620 may perform operations described above and below with respect to processor 612.

In some implementations, processor 612 may also determine whether the TXOP initiator has lost medium synchronization based on at least one of the following: (i) the TXOP initiator being affiliated with a second NSTR MLD operating on the NSTR link pair; (ii) another STA affiliated with the second NSTR MLD as another TXOP initiator on a second link of the NSTR link pair having participated in another TXOP; (iii) the TXOP initiator meeting a condition to start a second MediumSyncDelay timer of the TXOP initiator; and (iv) the second MediumSyncDelay timer of the TXOP initiator having not counted down to zero.

In some implementations, the condition may entail a transmission time being greater than a medium synchronization threshold.

In some implementations, in determining, processor 612 may determine prior to transmitting the control response frame or the trigger-based response frame. Moreover, in response to determining that the TXOP initiator has lost medium synchronization, processor 612 may use a modified CCA-ED threshold and a NAV mechanism in responding to the control frame.

In some implementations, processor 612 may also reset the first MediumSyncDelay timer to zero after transmitting the control response frame or the trigger-based response frame or after an end of the TXOP.

In yet another aspect pertaining to a medium access recovery mechanism for peer MLDs operating on a NSTR link pair in wireless communications in accordance with the present disclosure, with apparatus 610 implementing a STA affiliated with an NSTR non-AP MLD (e.g., MLD 110) and apparatus 620 implementing an AP affiliated with an NSTR AP MLD (e.g., MLD 120), processor 622 may perform operations as a first STA (e.g., AP1) on a primary link and a second STA (e.g., AP2) on a secondary link of an NSTR link pair, respectively. For instance, processor 622 may determine that the second STA has lost medium synchronization on the secondary link. Additionally, processor 622 may transmit, via transceiver 626 and as the first STA, a PPDU on the primary link. Moreover, processor 622 may start, as the second STA, a MediumSyncDelay timer at an end of transmission of the PPUD. Furthermore, processor 622 may transmit, via the transceiver and as the first STA and the second STA, a first initial frame on the primary link and a second initial frame on the secondary link to initiate new TXOPs on the NSTR link pair.

In some implementations, in transmitting the first initial frame and the second initial frame, processor 622 may transmit the first initial frame and the second initial frame when the MediumSyncDelay timer for the second STA has a non-zero value.

In some implementations, processor 622 may also perform a backoff procedure on each of the primary link and the secondary link before transmitting the first initial frame and the second initial frame on the primary link and the secondary link, respectively. In some implementations, in performing the backoff procedure on the secondary link, processor 622 may perform the backoff procedure using a Medium Synchronization OFDM ED threshold to detect a channel condition on the secondary link while the MediumSyncDelay timer for the second STA is non-zero. Moreover, in performing the backoff procedure on the secondary link, processor 622 may perform the backoff procedure using a regular OFDM ED threshold to detect a channel condition on the primary link.

In some implementations, processor 622 may also receive, via transceiver 626, a first response frame on the primary link and a second response frame on the secondary link responsive to transmitting the first initial frame and the second initial frame, respectively.

In some implementations, each of the first initial frame and the second initial frame may include a RTS frame, and each of the first response frame and the second response frame may include a CTS frame.

In some implementations, both of the first initial frame and the second initial frame may have a same start time.

Illustrative Processes

Figure 7:
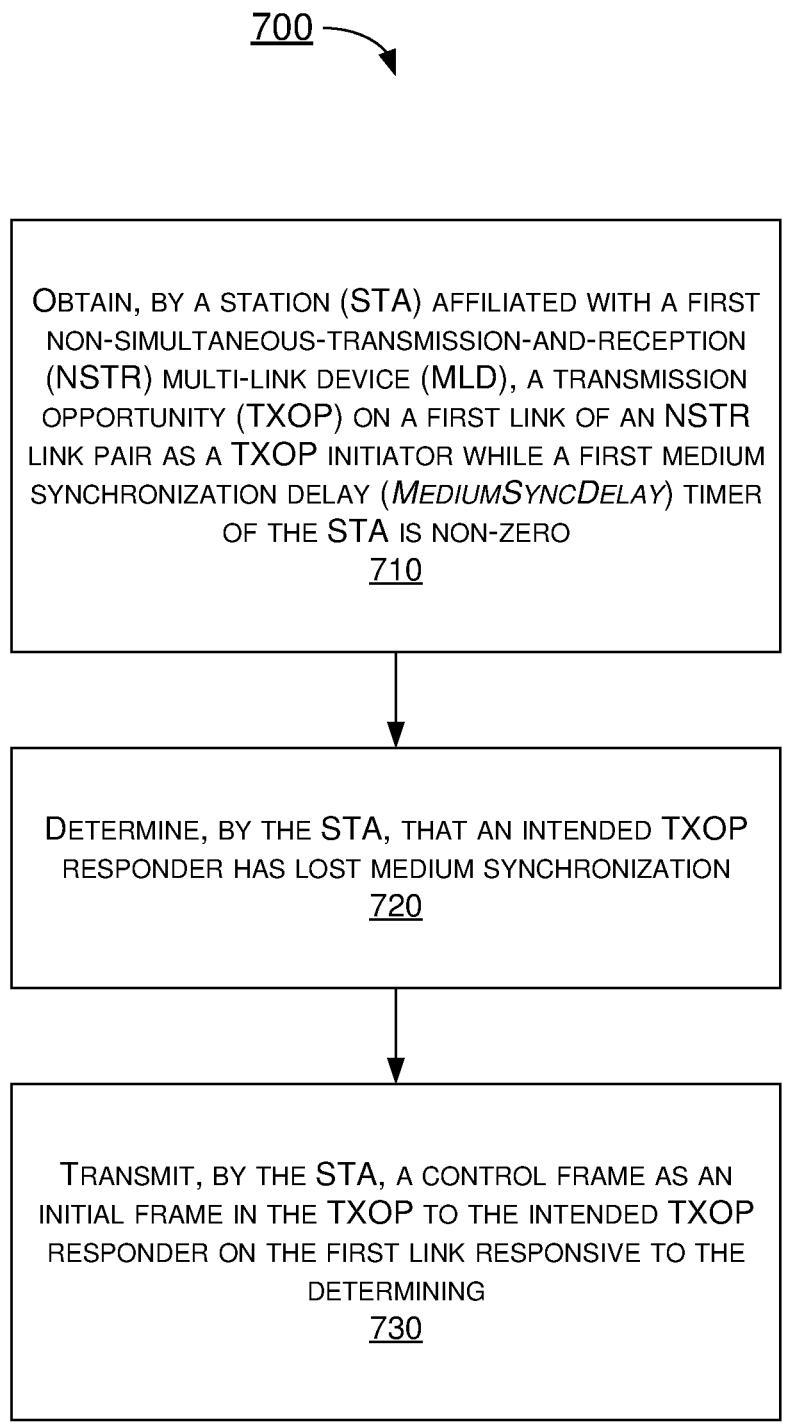
FIG. 7 is a flowchart of an example process in accordance with an implementation of the present disclosure.

FIG. 7 illustrates an example process 700 in accordance with an implementation of the present disclosure. Process 700 may represent an aspect of implementing various proposed designs, concepts, schemes, systems and methods described above. More specifically, process 700 may represent an aspect of the proposed concepts and schemes pertaining to a medium access recovery mechanism for peer MLDs operating on a NSTR link pair in wireless communications in accordance with the present disclosure. Process 700 may include one or more operations, actions, or functions as illustrated by one or more of blocks 710, 720 and 730. Although illustrated as discrete blocks, various blocks of process 700 may be divided into additional blocks, combined into fewer blocks, or eliminated, depending on the desired implementation. Moreover, the blocks/sub-blocks of process 700 may be executed in the order shown in FIG. 7 or, alternatively in a different order. Furthermore, one or more of the blocks/sub-blocks of process 700 may be executed repeatedly or iteratively. Process 700 may be implemented by or in apparatus 610 and apparatus 620 as well as any variations thereof. Solely for illustrative purposes and without limiting the scope, process 700 is described below in the context of apparatus 610 implemented in or as MLD 110 and apparatus 620 implemented in or as MLD 120 of a wireless network such as a WLAN in network environment 100 in accordance with one or more of IEEE 802.11 standards. It is noteworthy that, although examples described below are provide in the context of apparatus 610 implementing a STA affiliated with an NSTR non-AP MLD (e.g., MLD 110) and apparatus 620 implementing an AP affiliated with an NSTR AP MLD (e.g., MLD 120). It is noteworthy that process 700 may also be implemented in the context of apparatus 610 implementing an AP affiliated with an NSTR AP MLD (e.g., MLD 110) and apparatus 620 implementing a STA affiliated with an NSTR non-AP MLD (e.g., MLD 120). Process 700 may begin at block 710.

At 710, process 700 may involve processor 612 as a STA obtaining, via transceiver 616, a TXOP on a first link of an NSTR link pair as a TXOP initiator while a first MediumSyncDelay timer of the STA is non-zero. Process 700 may proceed from 710 to 720.

At 720, process 700 may involve processor 612 determining that apparatus 620 an intended TXOP responder has lost medium synchronization. Process 700 may proceed from 720 to 730.

At 730, process 700 may involve processor 612 transmitting, via transceiver 616, a control frame as an initial frame in the TXOP to the intended TXOP responder on the first link responsive to the determining.

In some implementations, the control frame may include a RTS frame, a MU-RTS frame, or a trigger frame.

In some implementations, in determining that the intended TXOP responder has lost medium synchronization, process 700 may involve processor 612 determining based on at least one of the following: (i) the intended TXOP responder being affiliated with a second NSTR MLD operating on the NSTR link pair; (ii) another STA affiliated with the second NSTR MLD as another intended TXOP responder on a second link of the NSTR link pair having participated in another TXOP; (iii) the intended TXOP responder meeting a condition to start a second Medium- SyncDelay timer of the intended TXOP responder; and (iv) the second MediumSyncDelay timer of the intended TXOP responder having not counted down to zero.

In some implementations, the condition may entail a transmission time being greater than a medium synchronization threshold.

In some implementations, process 700 may further involve processor 612 performing, via transceiver 616, a backoff procedure using a modified CCA-ED threshold to detect a channel condition.

In some implementations, process 700 may further involve processor 612 resetting the first MediumSyncDelay timer to zero after receiving a response frame from the intended TXOP responder or after an end of the TXOP.

In some implementations, process 700 may further involve processor 612 determining a backoff procedure using a modified CCA-ED threshold to detect a channel condition.

Figure 8:
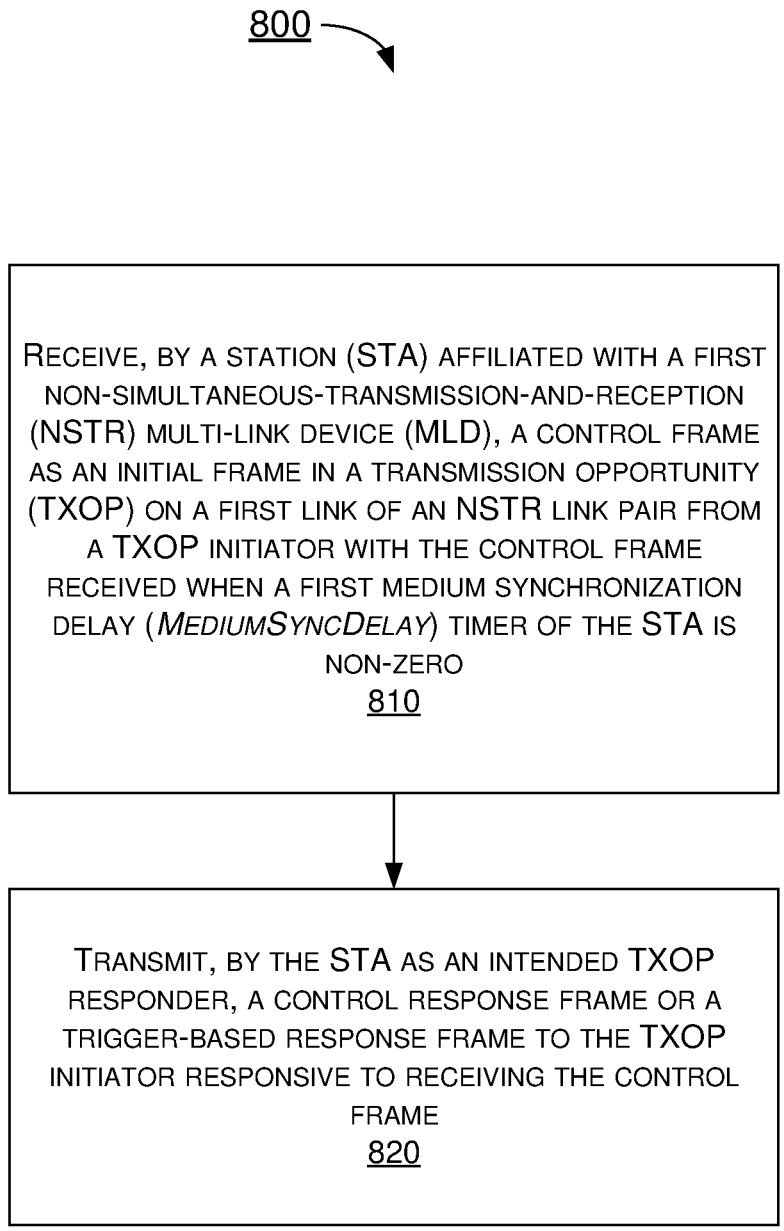
FIG. 8 is a flowchart of an example process in accordance with an implementation of the present disclosure.

FIG. 8 illustrates an example process 800 in accordance with an implementation of the present disclosure. Process 800 may represent an aspect of implementing various proposed designs, concepts, schemes, systems and methods described above. More specifically, process 800 may represent an aspect of the proposed concepts and schemes pertaining to a medium access recovery mechanism for peer MLDs operating on a NSTR link pair in wireless communications in accordance with the present disclosure. Process 800 may include one or more operations, actions, or functions as illustrated by one or more of blocks 810 and 820. Although illustrated as discrete blocks, various blocks of process 800 may be divided into additional blocks, combined into fewer blocks, or eliminated, depending on the desired implementation. Moreover, the blocks/sub-blocks of process 800 may be executed in the order shown in FIG. 8 or, alternatively in a different order. Furthermore, one or more of the blocks/sub-blocks of process 800 may be executed repeatedly or iteratively. Process 800 may be implemented by or in apparatus 610 and apparatus 620 as well as any variations thereof. Solely for illustrative purposes and without limiting the scope, process 800 is described below in the context of apparatus 610 implemented in or as MLD 110 and apparatus 620 implemented in or as MLD 120 of a wireless network such as a WLAN in network environment 100 in accordance with one or more of IEEE 802.11 standards. It is noteworthy that, although examples described below are provide in the context of apparatus 610 implementing a STA affiliated with an NSTR non-AP MLD (e.g., MLD 110) and apparatus 620 implementing an AP affiliated with an NSTR AP MLD (e.g., MLD 120). It is noteworthy that process 800 may also be implemented in the context of apparatus 610 implementing an AP affiliated with an NSTR AP MLD (e.g., MLD 110) and apparatus 620 implementing a STA affiliated with an NSTR non-AP MLD (e.g., MLD 120). Process 800 may begin at block 810.

At 810, process 800 may involve processor 612 as a STA receiving, via transceiver 616, a control frame as an initial frame in a TXOP on a first link of an NSTR link pair from apparatus 620 as a TXOP initiator, with the control frame received when a first medium synchronization delay (MediumSyncDelay) timer of the STA is non-zero. Process 800 may proceed from 810 to 820.

At 820, process 800 may involve processor 612 as an intended TXOP responder transmitting, via transceiver 616, a control response frame or a trigger-based response frame to the TXOP initiator responsive to receiving the control frame.

In some implementations, process 800 may further involve processor 612 determining whether the TXOP initiator has lost medium synchronization based on at least one of the following: (i) the TXOP initiator being affiliated with a second NSTR MLD operating on the NSTR link pair; (ii) another STA affiliated with the second NSTR MLD as another TXOP initiator on a second link of the NSTR link pair having participated in another TXOP; (iii) the TXOP initiator meeting a condition to start a second MediumSyncDelay timer of the TXOP initiator; and (iv) the second MediumSyncDelay timer of the TXOP initiator having not counted down to zero.

In some implementations, the condition may entail a transmission time being greater than a medium synchronization threshold.

In some implementations, in determining, process 800 may involve processor 612 determining prior to transmitting the control response frame or the trigger-based response frame. Moreover, in response to determining that the TXOP initiator has lost medium synchronization, process 800 may involve processor 612 using a modified CCA-ED threshold and a NAV mechanism in responding to the control frame.

In some implementations, process 800 may further involve processor 612 resetting the first MediumSyncDelay timer to zero after transmitting the control response frame or the trigger-based response frame or after an end of the TXOP.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
obtaining, by a station (STA) affiliated with a first non-simultaneous-transmission-and-reception (NSTR) multi-link device (MLD), a transmission opportunity (TXOP) on a first link of an NSTR link pair as a TXOP initiator while a first medium synchronization delay (MediumSyncDelay) timer of the STA is non-zero;
determining, by the STA, that an intended TXOP responder has lost medium synchronization; and
transmitting, by the STA, a control frame as an initial frame in the TXOP to the intended TXOP responder on the first link responsive to the determining,
wherein the determining that the intended TXOP responder has lost medium synchronization comprises determining based on at least one of:
the intended TXOP responder being affiliated with a second NSTR MLD operating on the NSTR link pair;
another STA affiliated with the second NSTR MLD as another intended TXOP responder on a second link of the NSTR link pair having participated in another TXOP;
the intended TXOP responder meeting a condition to start a second MediumSyncDelay timer of the intended TXOP responder; and
the second MediumSyncDelay timer of the intended TXOP responder having not counted down to zero, and
wherein the condition comprises a transmission time being greater than a medium synchronization threshold.

2. The method of claim 1, wherein the control frame comprises a request-to-send (RTS) frame, a multi-user RTS (MU-RTS) frame, or a trigger frame.

3. The method of claim 1, further comprising:
performing, by the STA, a backoff procedure using a modified clear channel assessment energy detection (CCA-ED) threshold to detect a channel condition.

4. The method of claim 1, further comprising:
resetting, by the STA, the first MediumSyncDelay timer to zero after receiving a response frame from the intended TXOP responder or after an end of the TXOP.

5. The method of claim 1, further comprising:
determining, by the STA, a backoff procedure using a modified clear channel assessment energy detection (CCA-ED) threshold to detect a channel condition.

6. A method, comprising:
receiving, by a station (STA) affiliated with a first non-simultaneous-transmission-and-reception (NSTR) multi-link device (MLD), a control frame as an initial frame in a transmission opportunity (TXOP) on a first link of an NSTR link pair from a TXOP initiator;
transmitting, by the STA as an intended TXOP responder, a control response frame or a trigger-based response frame to the TXOP initiator responsive to receiving the control frame; and
determining, by the STA, whether the TXOP initiator has lost medium synchronization based on at least one of:
the TXOP initiator being affiliated with a second NSTR MLD operating on the NSTR link pair;
another STA affiliated with the second NSTR MLD as another TXOP initiator on a second link of the NSTR link pair having participated in another TXOP;
the TXOP initiator meeting a condition to start a second medium synchronization delay (MediumSyncDelay) timer of the TXOP initiator; and
the second MediumSyncDelay timer of the TXOP initiator having not counted down to zero,
wherein the control frame is received when a MediumSyncDelay timer of the STA is non-zero, and
wherein the condition comprises a transmission time being greater than a medium synchronization threshold.

7. The method of claim 6, wherein the determining comprises determining prior to transmitting the control response frame or the trigger-based response frame, and wherein, responsive to determining that the TXOP initiator has lost medium synchronization, the STA uses a modified clear channel assessment energy detection (CCA-ED) threshold and a network allocation vector (NAV) mechanism in responding to the control frame.

8. The method of claim 7, further comprising:
resetting, by the STA, the first MediumSyncDelay timer to zero after transmitting the control response frame or the trigger-based response frame or after an end of the TXOP.

9. An apparatus implementable in a non-simultaneous-transmission-and-reception (NSTR) multi-link device (MLD), comprising:
a transceiver configured to communicate wirelessly; and
a processor coupled to the transceiver and configured to perform operations as a first station (STA) on a primary link and a second STA on a secondary link of an NSTR link pair, respectively, the operations comprising:
determining that the second STA has lost medium synchronization on the secondary link;
transmitting, via the transceiver and as the first STA, a physical-layer protocol data unit (PPDU) on the primary link;
starting, as the second STA, a medium synchronization delay (MediumSyncDelay) timer at an end of transmission of the PPUD; and
transmitting, via the transceiver and as the first STA and the second STA, a first initial frame on the primary link and a second initial frame on the secondary link to initiate new transmission opportunities (TXOPs) on the NSTR link pair,
wherein, in transmitting the first initial frame and the second initial frame, the processor is configured to transmit the first initial frame and the second initial frame when the MediumSyncDelay timer for the second STA has a non-zero value,
wherein the processor is further configured to perform a backoff procedure on each of the primary link and the secondary link before transmitting the first initial frame and the second initial frame on the primary link and the secondary link, respectively, and
wherein, in performing the backoff procedure on the secondary link, the processor is configured to perform the backoff procedure using a medium synchronization orthogonal frequency-division multiplexing (OFDM) energy detection (ED) threshold to detect a channel condition on the secondary link while the MediumSyncDelay timer for the second STA is non-zero.

10. The apparatus of claim 9, wherein, in performing the backoff procedure on the secondary link, the processor is further configured to perform the backoff procedure using a regular orthogonal frequency-division multiplexing (OFDM) energy detection (ED) threshold to detect a channel condition on the primary link.

11. The apparatus of claim 9, wherein the processor is further configured to receive a first response frame on the primary link and a second response frame on the secondary link responsive to transmitting the first initial frame and the second initial frame, respectively.

12. The apparatus of claim 11, wherein each of the first initial frame and the second initial frame comprises a request-to-send (RTS) frame, and wherein each of the first response frame and the second response frame comprises a clear-to-send (CTS) frame.

13. The apparatus of claim 9, wherein both of the first initial frame and the second initial frame have a same start time.

* * * * *